No. 689,291. Patented Dec. 17, 1901.
G. W. CROZIER.
CHECK ROW WIRE MACHINE.
(Application filed May 9, 1901.)
(No Model.) 8 Sheets—Sheet 1.
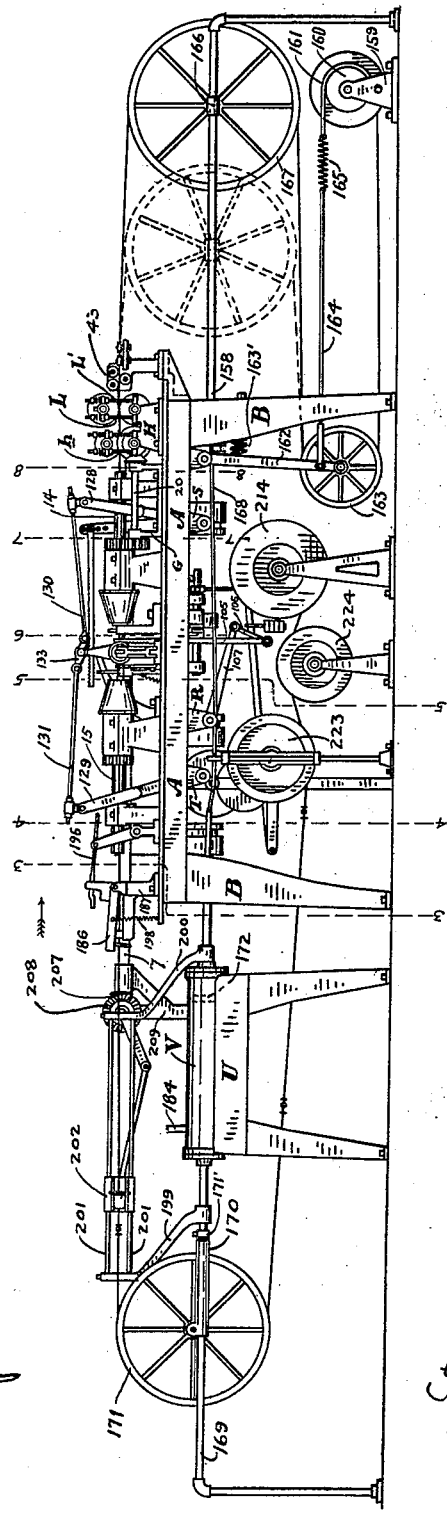
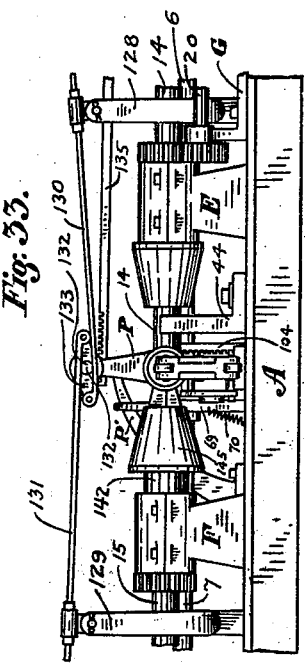
WITNESSES,
Thomas L. Ryan
W. A. Thornburg
INVENTOR,
George W. Crozier
by W. DuVal Brown
ATTORNEY.

No. 689,291. Patented Dec. 17, 1901.
G. W. CROZIER.
CHECK ROW WIRE MACHINE.
(Application filed May 9, 1901.)

(No Model.) 8 Sheets—Sheet 2.

No. 689,291. Patented Dec. 17, 1901.
G. W. CROZIER.
CHECK ROW WIRE MACHINE.
(Application filed May 9, 1901.)
(No Model.) 8 Sheets—Sheet 3.
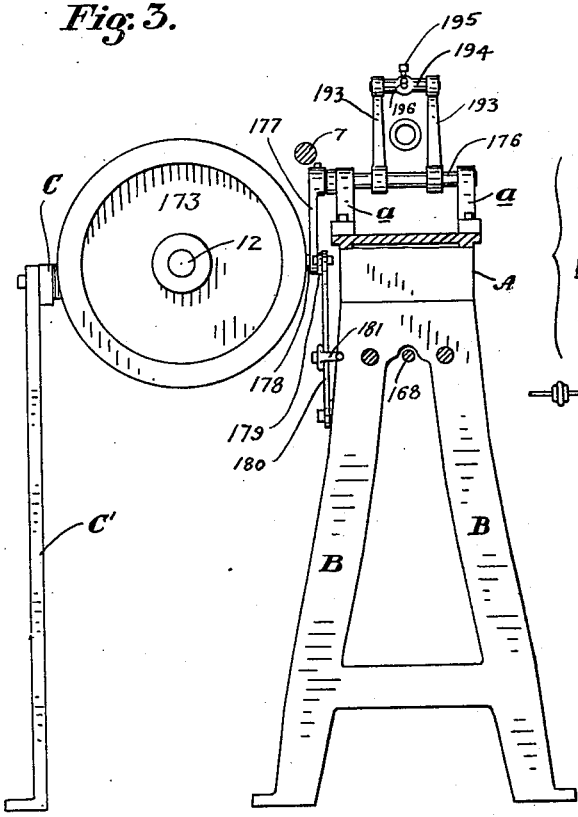
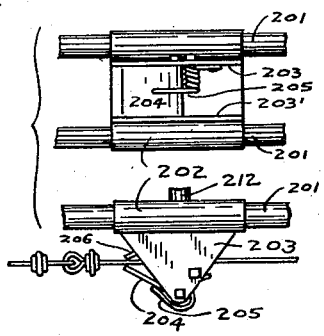
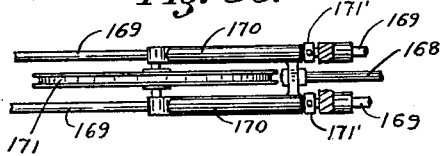
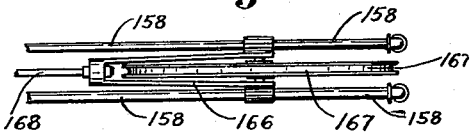
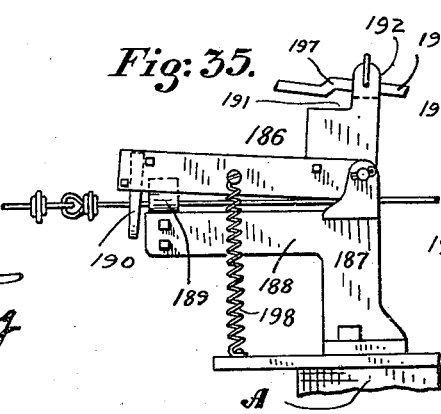

No. 689,291. Patented Dec. 17, 1901.
G. W. CROZIER.
CHECK ROW WIRE MACHINE.
(Application filed May 9, 1901.)
(No Model.) 8 Sheets—Sheet 4.
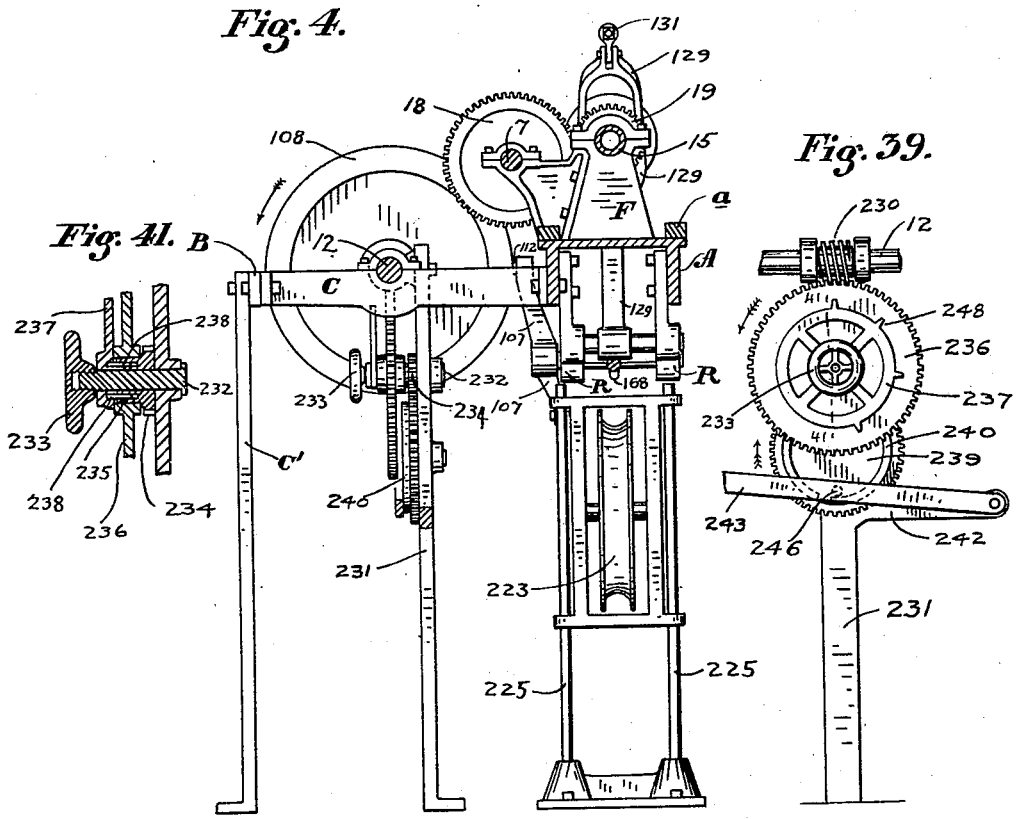
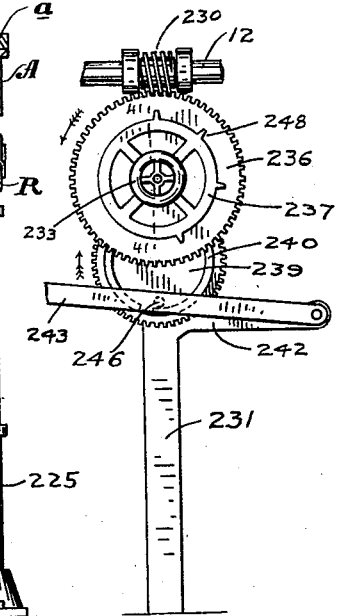
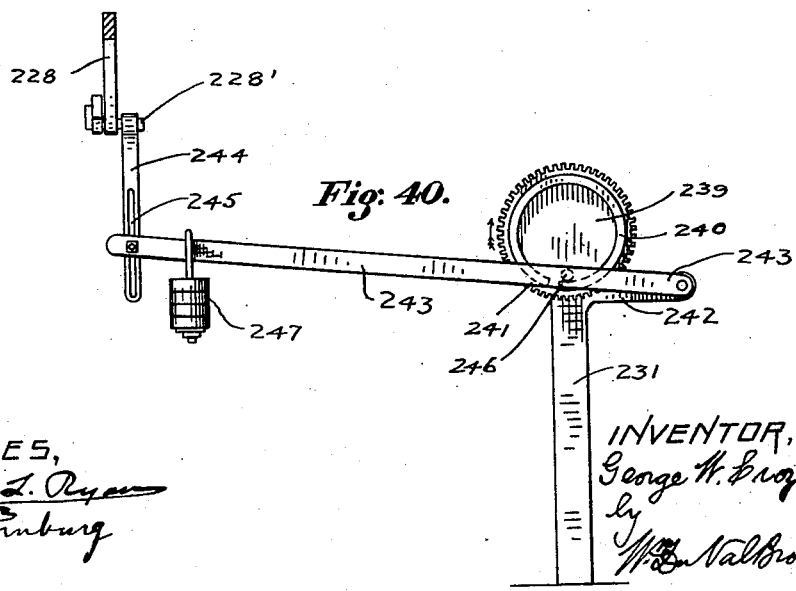
WITNESSES,
INVENTOR,
George W. Crozier
by
ATTORNEY.

No. 689,291. Patented Dec. 17, 1901.
G. W. CROZIER.
CHECK ROW WIRE MACHINE.
(Application filed May 9, 1901.)
(No Model.) 8 Sheets—Sheet 5.
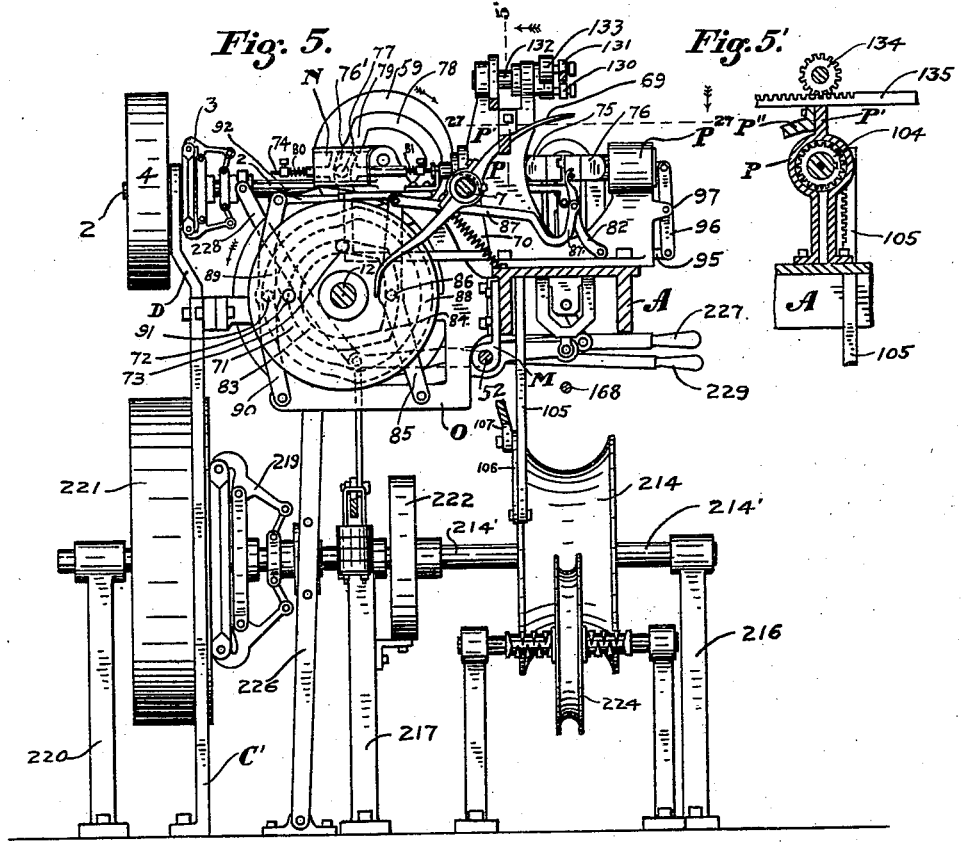
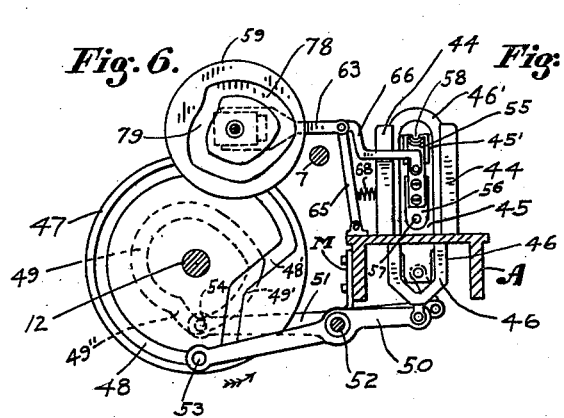
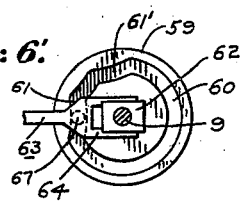
WITNESSES,
Thomas L. Ryan
W. A. Thornburg
INVENTOR,
George W. Crozier
by
W. DuVal Brown
ATTORNEY.

No. 689,291. Patented Dec. 17, 1901.
G. W. CROZIER.
CHECK ROW WIRE MACHINE.
(Application filed May 9, 1901.)
(No Model.) 8 Sheets—Sheet 6.
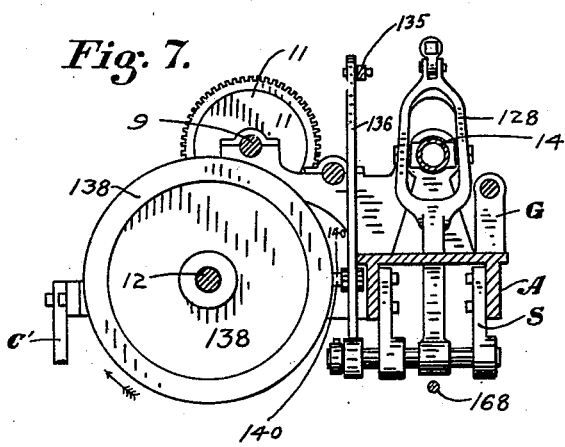
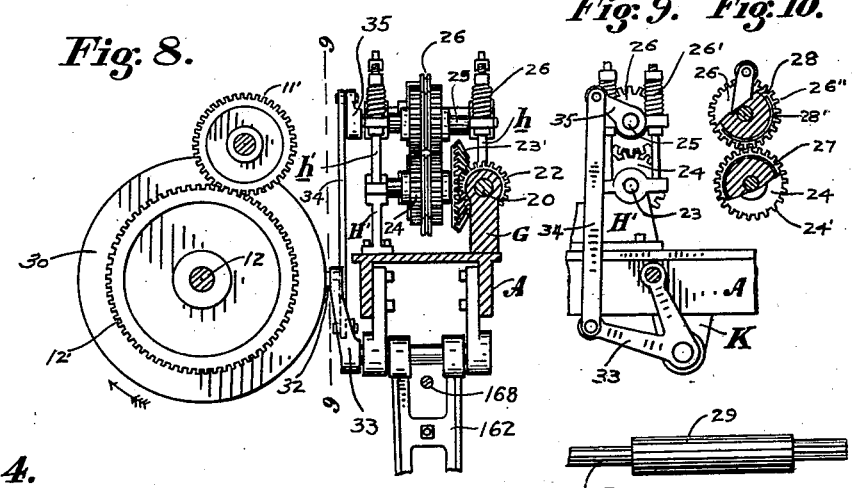
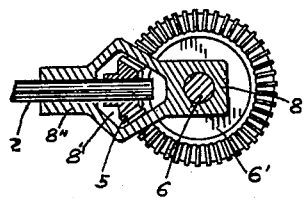
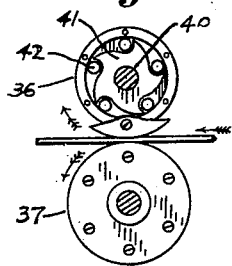
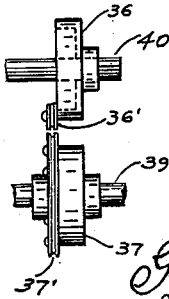
WITNESSES,
Thomas L. Ryan
W. A. Thornburg
INVENTOR,
George W. Crozier
by Wm DuVal Brown
ATTORNEY.

No. 689,291. Patented Dec. 17, 1901.
G. W. CROZIER.
CHECK ROW WIRE MACHINE.
(Application filed May 9, 1901.)
(No Model.) 8 Sheets—Sheet 7.
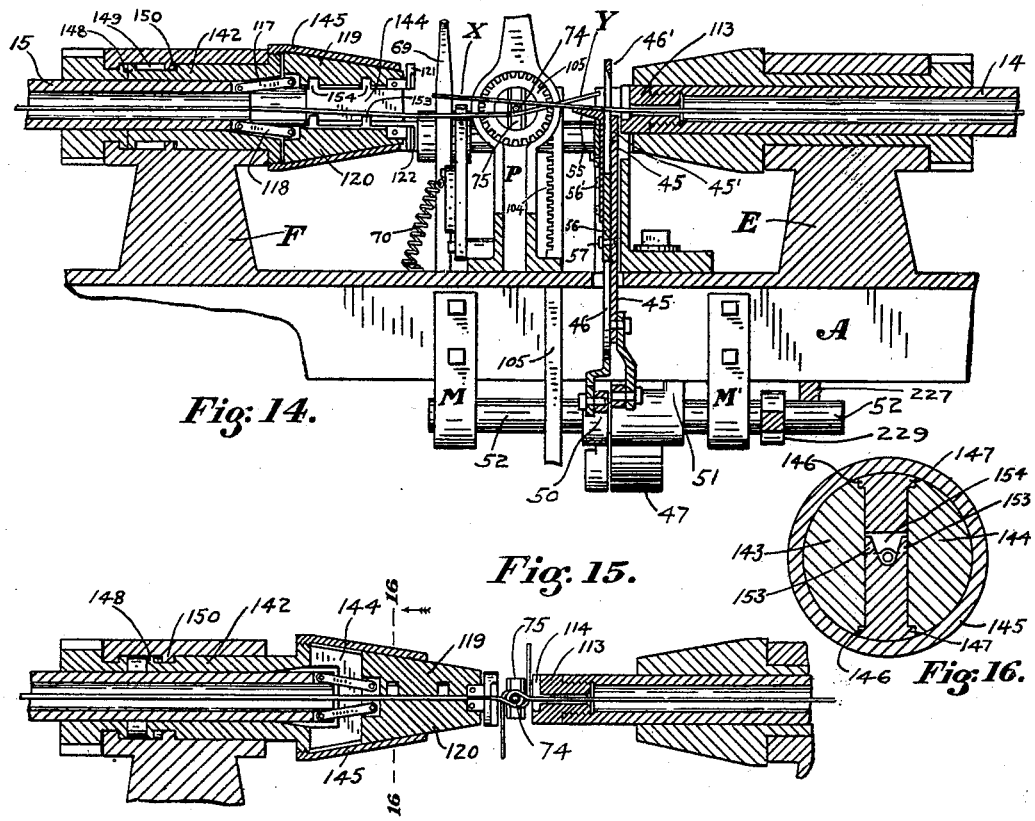
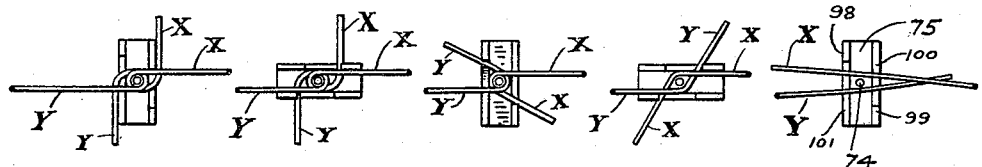
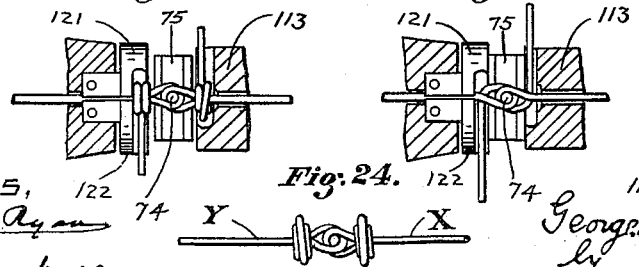
WITNESSES,
Thomas L. Ryan
W. A. Thornburg
INVENTOR,
George W. Crozier
by
Wm. A. N. Brown
ATTORNEY.

No. 689,291.　　　　　　　　　　　　　　　　　Patented Dec. 17, 1901.
G. W. CROZIER.
CHECK ROW WIRE MACHINE.
(Application filed May 9, 1901.)
(No Model.)　　　　　　　　　　　　　　　　　　　8 Sheets—Sheet 8.
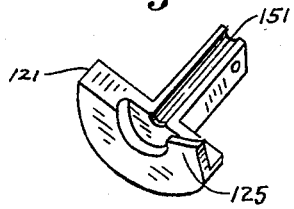
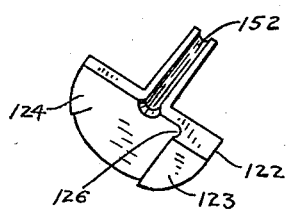
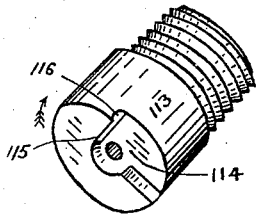
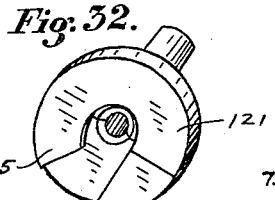
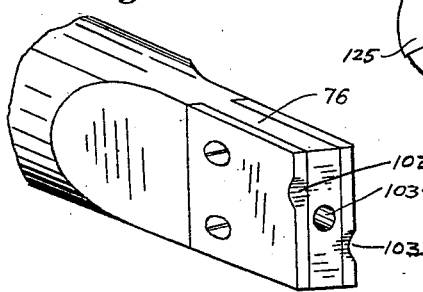
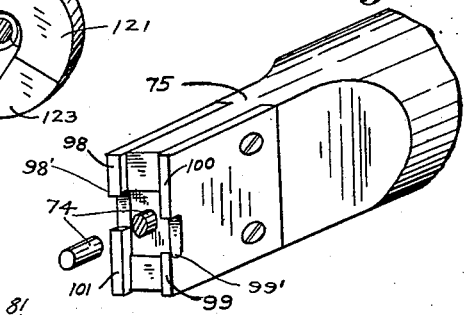
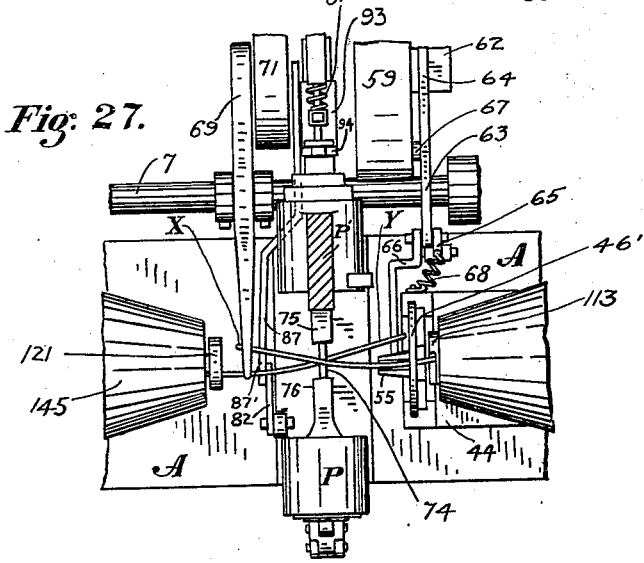
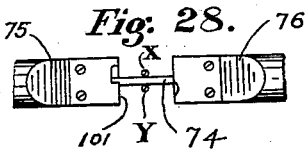
WITNESSES,　　　　　　　　　　　　　　　INVENTOR,
Thomas L. Ryan　　　　　　　　　　　　　　George W. Crozier
W. A. Thornburg　　　　　　　　　　　　　　By Wm DuVal Brown
　　　　　　　　　　　　　　　　　　　　　　ATTORNEY.
THE NORRIS PETERS CO., PHOTO-LITHO., WASHINGTON, D. C.

UNITED STATES PATENT OFFICE.

GEORGE W. CROZIER, OF MUNCIE, INDIANA.

CHECK-ROW-WIRE MACHINE.

SPECIFICATION forming part of Letters Patent No. 689,291, dated December 17, 1901.

Application filed May 9, 1901. Serial No. 59,398. (No model.)

*To all whom it may concern:*

Be it known that I, GEORGE W. CROZIER, a citizen of the United States, residing at Muncie, in the county of Delaware and State of Indiana, have invented a new and useful Check-Row-Wire Machine, of which the following is a specification.

The aim and purpose of this invention is to produce a check-row-wire machine which is entirely automatic in all its parts and which will produce the knots rapidly and at equal distances.

A further object is to produce a machine wherein the various mechanisms which are not in use are out of the way of the mechanisms in use and a machine which accomplishes these results without the aid of clutches. By this construction the various parts of the machine are always connected to the driving power, but are simply out of the way or inoperative when not required to perform their designated work. By dispensing with clutches of all descriptions I relieve the machine of all jars and am able to make a machine which is rapid in its work and durable.

Another purpose of this invention is to provide means for quickly drawing the formed knot from the knotting mechanism, so that the various parts can at once commence the operation of forming another knot. Combined with the means for drawing the knot I provide mechanism for always drawing the knot the exact distance required and mechanism for preventing the knot from being drawn too far. I also provide mechanism for preventing the wire from slipping back upon the reel once it has been drawn into the machine.

A still further purpose is to provide automatic means for stopping the machine when a predetermined amount of knotted wire has been formed, and also automatic means for winding the knotted wire into suitable reels.

A further object still is to provide an improved mandrel, which is provided with mechanism to prevent the wear of the same, and improved mechanism for actuating the vises and coiling-heads, and improved mechanism for guiding the ends of the cut wire into proper position on the mandrel ready for the looping and coiling mechanisms to perform their allotted work.

These and other objects not hereinbefore mentioned are accomplished by the construction and arrangement of parts illustrated in the accompanying drawings, forming a part of this specification, and wherein like letters and numbers of reference indicate corresponding parts in the several views, and in which—

Figure 1 is a side elevation showing one of my improved machines complete. Fig. 2 is a top plan view, enlarged, of Fig. 1 with the extreme ends of the machine omitted. Fig. 2' is a view of the cam-wheel 108 detached. Fig. 2" is a view of the cam-wheel 138 detached. Fig. 3 is a cross-section on the line 3 3, Figs. 1 and 2. Fig. 4 is a cross-section on the line 4 4, Figs. 1 and 2. Fig. 5 is a section on the line 5 5, Figs. 1 and 2. Fig. 5' is a vertical section, with parts omitted, on the line 5', Fig. 5. Fig. 6 is a cross-section on the line 6 6, Figs. 1 and 2. Fig. 6' is a side elevation of the opposite side of the cam 59 shown in Fig. 6. Fig. 7 is a cross-section on the line 7 7, Figs. 1 and 2. Fig. 8 is a cross-section on the line 8 8, Figs. 1 and 2. Fig. 9 is a section on the line 9 9, Fig. 8. Fig. 10 is a detached view of the feeding-wheels. Fig. 11 is a detached view of the shaft on which the upper feeding-wheel is journaled. Fig. 12 is a detail enlarged side elevation of the ratchet-wheels for preventing back movement of the wire, showing the side plate broken away on the upper wheel. Fig. 13 is an end view of Fig. 12. Fig. 14 is a vertical central longitudinal section through the coiling-heads. Fig. 15 is a vertical central longitudinal section through the coiling-heads, showing the heads closer together and the ends of the wire looped around the mandrel. Fig. 16 is a cross-section on the line 16 16, Fig. 15, through the two-part jaws. Figs. 17, 18, 19, 20, and 21 show the ends of the wire on the mandrel and the rotatable vise and the various positions the ends of the wire assume at the time they are being formed into loops. Fig. 22 is a section through the coiling-heads, showing them in position up against the vise and showing the position of the wire before the coiling takes place. Fig. 23 is a section through the coiling-heads, showing the coiling-heads slightly withdrawn from the vise to allow the second coil to be wrapped around the wire and just before the coiling-heads are once more forced up against the vises to complete the third coil over the first two coils. Fig. 24 is an enlarged view of the completed knot. Fig. 25 is an enlarged perspective view of the rotatable vise. Fig. 26 is an enlarged perspective view of the non-rotatable vise. Fig. 27 is an enlarged top plan view of the cutting, guiding, looping, and coiling mechanisms looking downward from the line 27, Fig. 5. Fig. 28 is a side elevation of the outer ends of the vises, showing the mandrel extended and the wire in position over and below the same. Fig. 29 is a perspective view of the integral coiling-head. Figs. 30 and 31 are perspective views of the two-part coiling-head, each figure showing one part. Fig. 32 is a perspective view of the two-part coiling-head when closed ready to do the coiling. Fig. 33 is a side elevation of the coiling and looping mechanisms, showing the heads together and in a position opposite to that shown in Fig. 1. Fig. 34 is a sectional view showing the bearing for the inner end of the primary actuating-shaft. Fig. 35 is a side elevation, enlarged, of the automatic stop. Fig. 35' is an enlarged view of the stop detached from its support. Fig. 36 is a top plan view showing the extreme drawing end of the machine. Fig. 37 is a top plan view of the extreme feeding end of the machine. Fig. 38 is a top plan and side elevation, respectively, of the head and parts carried thereby which form the auxiliary means for drawing the wire. Fig. 39 is a side elevation of a portion of the mechanism for automatically stopping the machine when a predetermined amount of knotted wire has been formed. Fig. 40 is a side elevation of a different portion of this mechanism; and Fig. 41 is a section on the line 41, Fig. 39, showing in section the means for regulating the mechanism for automatically stopping the machine at any predetermined length of knotted wire desired.

In the drawings, A designates a table, which is supported by the legs B. In the rear of the table A is a longitudinal bar B', parallel with the table. This bar is connected to the table by means of the cross-pieces C. The bar B' is supported by legs C' at suitable intervals. D designates a standard extending upwardly from the bar B'. This standard D supports the outer end of the primary actuating-shaft 2. On the outer end of this shaft is a clutch 3, which is adapted to engage the belt-pulley 4. On the inner end of the shaft 2 is a bevel gear-wheel 5, Fig. 34.

As shown in Fig. 2, on the right-hand side of the shaft 2, extending outwardly from the table, are two brackets E and E', respectively. On the left-hand side of the same shaft 2, and also extending outwardly from the table, are two brackets F F', respectively. Journaled in the brackets E E' is a shaft 6, and journaled in the brackets F F' is a shaft 7. The inner ends of the shafts 6 and 7 are provided with bevel gear-wheels 6' and 7', respectively, which mesh with the bevel gear-wheel 5 on the inner end of the shaft 2. By this construction it will be seen that the two shafts 6 and 7 will revolve in opposite directions for a purpose hereinafter described. The inner ends of the shafts 6 and 7 abut against each other and support a bearing-block 8. This block extends away from the table and has an opening 8', in which the bevel gear-wheel 5 is located, and is provided at its outer end with a bearing 8'', which supports the inner end of the shaft 2, all as shown in Fig. 34.

Supported on the brackets E and E', but farther away from the table than the shaft 6, is a shaft 9. On the outer end of the shaft 6 is a small gear-wheel 10, which meshes with a larger gear-wheel 11, which idles on the outer end of the shaft 9. Rigidly secured to the gear-wheel 11 is a smaller gear-wheel 11'.

12 designates a longitudinal shaft located to one side and below the table A. This shaft is supported by the cross-pieces C. Adjacent to the right-hand end of this shaft 12 is a gear-wheel 12', which meshes with the gear-wheel 11'. By this construction it will be seen that motion is imparted to this shaft from the shaft 2 by means of the shaft 6 and gearing, as just described. On the shaft 12 is a gear-wheel 13, and on the shaft 9 is a gear-wheel 13', which meshes with the gear-wheel 13. By this construction motion is imparted to the shaft 9 from the shaft 12. Motion is imparted to the shaft 9 from the shaft 12 instead of directly from the shaft 6, so as to procure the proper speed of the shaft 9, it being remembered that the gear-wheels 11 and 11' simply idle on the shaft 9.

Journaled on the brackets E E' and above the table is a shaft 14. A shaft 15 is similarly journaled on the brackets F F'. On the shaft 6 is a gear-wheel 16, which meshes with a gear-wheel 17 on the shaft 14. On the shaft 7 is a gear-wheel 18, which meshes with a gear-wheel 19 on the shaft 15. By this construction it will be seen that the two shafts 14 and 15 will be rotated, but in opposite directions. These two shafts carry the coiling-heads and are slidingly secured in the brackets, so that they can be brought toward each other, as hereinafter described.

G designates a standard extending upwardly from the table and located adjacent to the feed end of the machine and on one side of the bracket E'. Journaled in this standard is a shaft 20. On one end of this shaft is a gear-wheel 21, which meshes with the gear-wheel 17 to give motion to the said shaft. On the opposite end of the shaft is a bevel gear-wheel 22. Just beyond this gear-wheel is a standard H, and directly opposite this standard is another standard H'. Part way up these standards and extending transversely across the table is a shaft 23, which has secured thereon a bevel gear-wheel 23', which meshes with the bevel gear-wheel 22 on the shaft 20. By this arrangement of gearing motion is imparted to the shaft 23. Rigidly secured on the shaft 23 is the lower wire-feed wheel 24. Journaled in spring-bearings 26' on the upper ends of the posts $h\ h'$ is a shaft 25. 26 designates the upper wire-feed wheel. Both of these feed-wheels are provided with intermeshing gear-teeth, so that motion is imparted to the upper wheel from the lower wheel, the upper wheel simply idling on the shaft 25. These gear-teeth are designated on the drawings by the numbers 24' and 26", respectively, and are plainly shown in Figs. 8, 9, and 10. These wheels are also provided with an annular groove 27 and 28, respectively, the groove 28 being on the upper wheel. The groove 28 is provided with a slight protrusion 28', which extends partly around the groove, as plainly shown in Fig. 10.

The shaft 25 is provided with an enlargement 29, which is positioned eccentric to the axial line of the shaft 25, as shown in Fig. 11. On this enlarged portion is journaled the upper wheel 26.

30 designates a cam-wheel on the extreme front end of the shaft 12. On the periphery of this wheel is a cam-groove 31, as plainly shown in Fig. 2. Working in this cam-groove 31 is a stud 32, which is secured to one end of a bell-crank 33, which is pivoted on a bracket K, depending from the table A. The opposite end of this crank is pivoted to an upwardly-extending link 34. The upper end of this link is pivoted to the outer end of a crank-arm 35, which is rigidly secured to the end of the shaft 25, all as plainly shown in Figs. 8 and 9.

By referring to Fig. 2 it will be seen that the cam-groove 31 on the wheel 30 is provided with an offset 31', so that when the stud 32 passes through this offset portion it will move the crank 33 in the position shown in Fig. 9, pulling the crank-arm 35 down, rotating the shaft 25, and lowering the eccentric portion 29. As the upper wheel 26 is journaled on this eccentric portion, the wheel will be lowered and bear tightly against the lower wheel. The wire is fed between these wheels in the grooves 27 and 28, and at the time the upper wheel is lowered the protrusion 28' is on the lower portion of the wheel, bearing directly against the wire, feeding the same forward toward the coiling mechanism. The length of the protrusion is just sufficient to feed the proper amount of wire, and after this amount is fed the stud 32 leaves the offset portion of the cam-groove 31, moving the crank 33 to the right, thereby raising the upper wheel until it reaches the position shown in Fig. 10, where it will stay until necessary to again feed the wire. By this construction I obtain a very tight grasp on the wire, which will always positively feed the exact amount of wire at the proper time, and when not feeding the wire the feeding-wheels will be out of the way, but still in gear. It will also be noticed that the feeding-wheels will still be rotating, but performing no function, so that a clutch can be dispensed with.

To prevent any backward movement of the wire after the same has been fed forward, I provide two wheels 36 and 37, which bear against the top and bottom of the wire. These wheels are plainly shown in Figs. 12 and 13. To act as a brake on the wire, these wheels must be provided with means so that they can only revolve in one direction, and to do this I use the following mechanism: On the standard H in the rear of the lower feed-wheel I rigidly secure a transverse shaft 39. On this shaft 39 is the wheel 37, which can only idle in one direction. Extending upwardly from the standards H H' are posts L L'. Secured to the upper portion of these posts is a stationary shaft 40, on which the wheel 36 can idle in only one direction. As the mechanism for preventing these two wheels from rotating in one direction is identical in both, a description of one will be sufficient. By referring to Fig. 12 it will be seen that on the shaft 40 is a star-wheel 41, the points of the wheel being formed with concavo-convex sides. Resting in the concave sides of the points is a pin 42. The wheels 36 and 37 are hollow and surround the star-wheels and the pins. By again referring to Fig. 12 it will be seen that if the wire passes between them in the direction of the arrow the upper wheel can revolve around the clutch mechanism; but the instant the wheel starts to revolve in the opposite direction the pin will ride up the convex portion of the points on the star-wheel and instantly stop the wheel. The action is almost instantaneous and there is no lost motion whatever. It is to be understood that inasmuch as the two wheels revolve in opposite directions it will be necessary to reverse the star-wheel on the shaft 39. The front portions of these wheels are provided with an enlarged face, in which is an annular groove 36' and 37', respectively. The wire passes through these grooves, and the two wheels are so spaced apart that they will bear tightly against the wire and prevent any backward movement of the same.

43 designates a series of ordinary wire-straightening devices. (Shown in Figs. 1 and 2.)

In the construction of this machine the cutting mechanism is located between the feeding and knotting mechanism and a short distance to one side of the latter.

The cutting mechanism is more plainly shown in Figs. 6, 6', and 14.

Referring particularly to Fig. 6, 44 designates a pair of guides extending upwardly from the table. Working in these guides are two knives 45 and 46. The knife 46 consists of an elongated frame with a curved upper end 46', which forms the cutting mechanism. The knife 45 is provided on its upper end with a cutting-surface. In the operation of the cutting mechanism these two knives are reciprocated toward each other, the knife 45 raising and the knife 46 lowering. On the shaft 12 is a cam-wheel 47. This cam-wheel is provided with a cam-groove 48 on one side and a cam 49 on the opposite side. Pivoted to the lower end of the knife 46 is a lever 50, and pivoted to the lower end of the knife 45 is a lever 51. These two levers are pivoted on a bearing-rod 52, which is suspended from the table A by means of the brackets M M', as plainly shown in Fig. 14. The opposite ends of these levers are provided with studs 53 and 54, which work in the cam-grooves 48 and 49, respectively. The groove 48 is provided with an offset portion 48', and the groove 49 is provided with two offset portions 49' and 49''. In the position of the parts as shown in Fig. 6, the cam-wheel traveling in the direction of the arrow, the wire has just been cut for the reason that the stud 53 has just traveled the offset portion 48', lifting that end of the lever 51 and lowering the opposite end, and therefore the knife 46. This result, as can readily be seen, is accomplished by drawing the stud 53 in toward the center of the cam, the offset portion 48' being arranged that way, as shown. At the same time this is being done the stud 54 is traveling in the offset portion 49', which is farther away from the common center than the groove 49, thereby depressing the end of the lever 51 and raising the opposite end and the knife 45.

As hereinafter described, it is necessary to support the knife 45 in its uppermost position for a certain time, which time is measured by the time it takes for the stud 54 to pass through the offset portion 49'. When the stud 54 reaches the position shown in Fig. 6, this result, to be described, has been accomplished and it is necessary to lower the knife suddenly to pass out of the way of the coiling mechanism. So for that reason the groove 49 is provided with the short offset portion 49'', which will suddenly bring the stud 54 toward the center, thereby raising that end of the lever 51 and lowering the opposite end, and therefore the knife 45. After the stud passes out of the offset portion 49'' it again passes into the groove 49, and the knife remains stationary until the next cutting takes place in the same manner. After the stud 53 passes out of the offset portion 48' it passes into the groove proper, 48, and the knife 46 remains stationary until the next cutting takes place.

The reason that it is necessary to hold the knife 45 in its upward position for a predetermined period is that the knife supports a guide and holder 55. The guide is provided with a depending portion, which is rigidly secured to a plate 56 by means of the bolts 56', and the plate in turn is pivoted to the knife 45 by means of the pivot 57. The guide and holder is provided with a groove 58 to retain the wire. This groove is plainly shown in Fig. 6.

59 designates a cam-wheel, which is journaled on the inner end of the shaft 9, and, as shown in Fig. 6', one side of this cam-wheel is provided with the cam-groove 60, which is provided with the offset portions 61 61'. For the purpose of convenience it might be well to state that the opposite side of this wheel is shown in Fig. 5.

62 designates a block rotatably secured on the shaft 9.

63 designates a shaft having a bifurcated end 64, which slides over the block 62.

65 designates a post having its lower end pivoted to the table A and its upper end pivoted to the lever 63.

66 designates a lever having one end pivoted to the post 65 and its opposite end pivoted to the guide and holder 55.

68 designates a spring between the post 65 and guide 44 to take up all lost motion.

In the operation of the machine, as far as described and assuming that a knot has just been formed, the knot is moved to the left by the mechanism to be described hereinafter. The knot is moved just far enough away from the knives to leave the exact amount of wire to make one loop of the knot and make the knot the required distance from the preceding knot. When this has been accomplished, the mandrel, to be described, is moved out and the wire is cut by the mechanism just described, leaving the end of the wire Y, plainly shown in Figs. 14 and 17. When the knife 45 is in its lower position, the guide and holder is moved to the right by virtue of the stud 67 on the shaft 63 resting in the groove 60 in the wheel 59. Just after the moment the cutting has taken place the stud 67 enters the offset portion 61 in the groove 60, bringing the guide and holder into the position as shown in Fig. 6. Just after this has been accomplished the feed-wheel 26 is lowered down tight against the feed-wheel 24 by the mechanism described, and the protrusion 28' will bear tightly against the wire and feed a sufficient amount, as shown at X, Figs. 14 and 17, the length of the wire fed and the length of the protrusion being the same. When this has been accomplished, the upper feed-wheel is raised, as described, and the clutch-wheels 36 and 37 will prevent any backward movement of the wire. By referring more particularly to Fig. 14 it will be noticed that the guide and holder 55 is slightly inclined, thereby forcing the end X of the wire upwardly and over the mandrel, to be described, as shown in said figure. After the wire has been thus fed the knife 45 lowers, the stud 67 goes back into the groove 60 through the offset 61', thereby moving the guide and holder 55 to the left and out of the way of the advancing coiling-head, also to be described. Before the guide 55 lowers it moves to the right, carrying the wire X with it, as hereinafter described.

For the purpose of convenience the cutting mechanism has been described in advance of the looping mechanism, although the mandrel is in position before the cutting takes place.

By referring to Fig. 5, 69 designates a finger pivoted on the shaft 7. One end of this finger extends out over the wire. 70 designates a spring secured to the finger and table A for normally holding the outer end of the finger in its upper position. 71 designates a cam-wheel secured to the shaft below and slightly to the left of the cam-wheel 59, as shown in Figs. 2 and 5. On this cam-wheel 71 are two pins 72 and 73. In the rotation of the wheel both of these pins are adapted to abut against the inner end of the finger 69 and lower the outer end of the same at different times.

In the position of the parts shown in Fig. 5, the wheel revolving in the direction of the arrow, the pin 72 has already lowered the finger 69, so that it will strike against the wire. This is accomplished after the knot has been formed and drawn forward and just before the cutting has taken place. This operation depresses the wire, so that the mandrel, which is designated as 74, can be moved forward over the wire, as hereinafter described, making the wire designated as Y assume the position shown in Fig. 14—that is, under the mandrel.

75 and 76 designate two vises oppositely opposed to each other and adapted to have a sliding movement toward each other. These vises are supported in the standard P. In the vise 75 is slidingly secured the mandrel 74. The rear end of the mandrel is supported in the bearing N, as plainly shown in Fig. 5. 76' designates a block on the mandrel working in the bearing N. The block is provided with a stud 77. All these parts are shown in dotted lines, Fig. 5. 78 designates a cam-groove in the wheel provided with an offset portion 79. This offset portion is slightly broken and irregular to keep the mandrel moving slightly, so that the wire will never be coiled around the same in the same place, thereby preserving the life of the mandrel. The stud 77 is adapted to work in the groove. On the mandrel are two springs 80 and 81, which normally tend to keep the mandrel in a withdrawn position from the center in case of breakage of other parts of the machine. In the position of parts shown in Fig. 5 the stud has entered the offset portion 79 of the groove 78, and as this offset portion is nearer the center of the wheel the stud is carried to the right, thereby moving the mandrel toward the center of the machine. Now after the mandrel is in position and the cutting of the wire has taken place and the end of the wire assumed the position under the mandrel by means of the finger 69 striking against it and forcing it down the guide and holder 55, already described, has been moving toward the left and has struck the end of the wire Y and moved it to the left, as shown in Fig. 27. In this position the guide and holder 55 is ready to receive the end of the wire X. After the guide and holder 55 has guided the end of the wire X up over the mandrel the guide and holder commences to move to the right before the knife 45 commences to descend, thereby carrying the inner end X of the wire to one side of the center, as shown in Fig. 27. This is accomplished by means of the stud 67 entering the offset 61' in the groove 60 in the wheel 59, as shown in Fig. 6'.

To support the end of the wire Y, it is necessary to supply a holder, which is designated as 82 and plainly shown in Fig. 5. As it is only necessary to provide this holder just after the wire has been cut and until the mandrel is in position and the vise, to be described, has grasped the wire, and then to get the holder out of the way as soon as possible, so as not to interfere, I provide the following mechanism: On the opposite side of the wheel 71 from that shown in Fig. 5 I provide a cam-groove 83, which is formed with an offset portion 84. O designates a bracket supported from the framework. Pivoted on this bracket is a lever 85, which is provided with a stud 86, which rides in the groove 83. The upper end of this lever is pivoted to a connecting-rod 87, which is provided with an upwardly-extending crook 87', which is pivoted to the holder 82. The only object of the crook 87' is in the convenience of construction allowing the rod to pass freely under the shaft 7. As shown in Fig. 5, the holder 82 is in position to hold the end of the wire Y. This is accomplished by virtue of the stud 86 on the lever 85 working in the offset portion 84 of the cam 83. This holder not only supports the wire, but throws over the wire, so that it will cross the wire X, allowing the two ends to be twisted in forming the loop, all as shown in Fig. 27.

The two vises 75 and 76 are reciprocated toward each other by means of the following mechanism: On the opposite side of the cam-wheel 71 from that shown in Fig. 5 is a cam-groove 88, provided with an offset portion 89. Pivoted on the bracket O is a lever 90, provided with a stud 91, which works in the groove 88. The upper end of this lever is pivoted to a rod 92. This rod is provided with a support 93, which has a collar 94 partly surrounding the inner end of the vise 75, so that the vise can freely rotate, as hereinafter described and as shown in Fig. 27. Secured to the rod 92 is a rod 95, which extends through the standard P through to the front part of the machine. Pivotally secured to this rod 95 is a rock-arm 96, which is pivoted centrally to the standard P, as shown at 97. The upper end of this rock-arm is pivotally secured to the outer end of the vise 76. It will readily be seen that this rock-arm reverses the movement of the vise and that when the rod 92 is moved to either the right or left by virtue of the cam and lever 91 as described, the vises will be either moved toward or away from each other. Before the vises are moved up the ends of the wire have assumed the position shown in Figs. 14, 17, and 27. By referring to Fig. 25 it will be seen that the end of the vise 75 is provided with two bending portions 98 and 99 and two rams 100 and 101 and that the vise 76 (shown in Fig. 26) is provided with two grooves 102 and 103, complementary to the respective rams 100 and 101 on the vise 75. The bending portions 98 and 99 are provided with grooves 98' and 99' to hold the wire therein when the coiling takes place. Assuming that the ends of the wire are in the position shown in Fig. 27, when the two vises come together the end of the wire X will pass under the bending portion 98 on the vise 75 and the ram 100 will force the same wire into the groove 102 on the vise 76. At the same time the end of the wire Y will be engaged by the bending portion 99 and the ram 101 will force this wire into the groove 103. 103' is an aperture in the vise 76, in which the end of the mandrel is adapted to fit. When this has been accomplished, the wires are in proper position above and below the mandrel and the vises move forward ready for the looping to take place. Before the vises come together the position of the cam-wheel 71 is such that the pin 73 is under the inner end of the finger 69, thereby depressing the same, so that it will strike against the end of the wire X to insure that this wire is low enough to be always under the bending portion 98 on the mandrel 75. The wires now being in position for looping it is well to state that the vise 76 is non-rotatable and that the vise 75 rotates, looping the wires around the mandrel. By referring to Fig. 5' it will be seen that on the vise 75 is keyed a gear-wheel or pinion 104. Meshing with this pinion extending up through the table A is a rack 105. The standard P is provided with a slot, (not shown,) so that these two parts can mesh with each other. The lower end of this rack is pivoted to an upwardly-extending link 106, which has its upper end pivoted to a bell-crank lever 107, which in turn is pivoted to the table shown in Figs. 1 and 4. 108 designates a cam-wheel on the shaft 12. This cam-wheel is provided with a cam-groove 109, which has two offset portions 110 and 111, as shown in Fig. 2', which is a detached view of the wheel 108. The bell-crank lever 107 is pivoted to the depending bracket R. (Shown in Figs. 1 and 4.) The upper end of this bell-crank lever is provided with a stud 112, which works in the cam-grooves in the wheel 108. The wheel 108 revolving in the direction of the arrow, Fig. 4, at the time just after the vises have come together, the stud 112 will enter the groove 110, moving the bell-crank lever 107 to the left, raising one end, and therefore the rack-bar 105. This offset 110 is so positioned on the wheel 108 that it will raise the rack 105 just far enough to rotate the vise a three-quarter turn. In Fig. 17 the vise is in its initial position. Fig. 18 shows the position of the wire at the first quarter-turn, Fig. 19 shows it at the second quarter, and Fig. 20 shows it at the third quarter with the loop completed. In order to provide room for the coiling-heads, to be described, to come up tight against the vises, it is necessary to reverse the vise 75 a quarter-turn, as shown in Fig. 21. This is accomplished by the rotation of the wheel 108 allowing the stud 112 on the lever 107 to leave the offset portion 110 and enter the offset portion 111, thereby slightly lowering the rack-bar to give the backward quarter-turn to the vise. The looping being completed the next operation is to coil the ends of the wire around the wires to complete the knot. The two coiling-head shafts 14 and 15 are formed hollow, as plainly shown in Figs. 14 and 15. On the end of the coiling-head shaft 14 is screwed the coiling-head 113, more plainly shown in Fig. 29. This coiling-head 113 is provided with a cut-out portion 114, which forms a shoulder 115, which bears against the end of the wire to do the coiling. The shoulder 115 is provided with a groove 116, so that the end of the wire cannot slip out. On the end of the shaft 15 are pivoted two links 117 and 118, as plainly shown in Figs. 14 and 15. Pivoted to the opposite ends of these links are the two complementary coiling-jaws 119 and 120. Secured to the outer ends of these jaws are the coiling-heads 121 and 122, respectively. The construction of these coiling-heads is plainly shown in Figs. 30, 31, and 32. The coiling-head 122 is provided with a shoulder 123 on one side and a slightly-beveled portion 124 on the opposite side. The coiling-head 121 is provided with a lip 125, which is adapted to fit over the bevel portion 124 on the other head when the parts come together, as shown in Fig. 32. The shoulder 123 bears against the end of the wire to do the coiling and is provided with a groove 126 to prevent the wire from slipping from the same. By referring to Fig. 32 it will be seen that the lip 125 when the heads are closed will extend over the lower head, thereby overlapping the joint and preventing the wire from passing between the heads if for any reason the heads should come slightly apart. The jaws and coiling-heads 121 and 122 are automatically closed and opened by the reciprocation of the shaft 15. The object of opening the jaws and coiling-heads is to allow the knot which has been formed to be pulled out, as hereinafter described.

The shafts 14 and 15, carrying the coiling-heads just described, are moved together by means of the following mechanism: By referring to Fig. 1, 128 designates a lever having its lower end pivoted to the depending bracket S. This lever is secured to the shaft 14, so that there can be no sliding movement; but the shaft 14 can rotate. This is accomplished in any well-known manner, and the means is not shown in the drawings. 129 designates a similar lever having its lower end pivoted to the depending bracket T. This lever is secured to the shaft 15 in a similar manner as is the lever 128 secured to the shaft 14. Pivotally secured to the upper end of the lever 128 is a pitman 130, which extends toward the center of the machine. Pivotally secured to the upper end of the lever 129 is a pitman 131, which also extends toward the center of the machine. By referring to Fig. 5 it will be seen that the standard P has an upwardly-extending portion P', which is bifurcated at its upper end and supports a transverse shaft 132. On the outer end of this shaft is rigidly secured a rock-arm 133, to the opposite ends of which are pivotally secured the inner ends of the pitmen 130 and 131, as plainly shown in Figs. 1 and 33. To the opposite end of this shaft is rigidly secured a pinion 134. P'' is a brace for supporting the extension P'. Resting on top of the extension P' is a rack-bar 135, which is located beneath the pinion 134 and meshes therewith. This rack has its rear end pivotally secured to a lever 136, which has its lower end pivoted to the bracket S, as shown in Fig. 7. 138 designates a cam-wheel supported on the shaft 12. This cam-wheel is provided on its periphery with a cam 139, and the lever 136 is provided with a stud 140, which engages this cam. The cam 139 is provided with an offset portion 141. By referring to Fig. 2 it will be seen that the coiling-heads are apart and that the stud 140 is riding in the cam 139. In the rotation of the wheel 138 the stud will pass into the offset portion 141, moving the lever 136 to the right and also the rack carried thereby, thereby rotating the pinion 134 and the shaft 132 and moving the rock-arm 133 into the position shown in Fig. 33. This operation, as will be plainly seen, draws the two levers toward each other, and as these levers are secured to the shafts 14 and 15 the heads will be drawn together, as shown in Fig. 22, and the heads are now ready to do the coiling.

In Fig. 14 the coiling-head jaws and heads 121 and 122 are shown in their open position. It is not necessary to open the coiling-head 113, for the reason that after the knot is formed the knot is moved to the left and the knot does not pass through the head. Before the coiling-heads 121 and 122 do the coiling it is necessary that these heads come together and form practically one head, as shown in Fig. 32. To accomplish this result, the following mechanism is employed: As before described, the two coiling-heads 121 and 122 are rigidly secured to the coiling-jaws 119 and 120, and these jaws are secured to the shaft 15 by means of the links 117 and 118. Surrounding the shaft 15 is a sleeve 142. The outer end of this sleeve is bifurcated, forming the two portions or lips 143 and 144, and between these lips the jaws 119 and 120 work, as plainly shown in Fig. 16. Screwed onto the end of the sleeve 142 is a cap 147, which tapers inwardly toward the center of the machine, as plainly shown in Figs. 14 and 15. The two jaws 119 and 120 are adapted to have a sliding movement in this cap. The two jaws are also adapted to have a sliding movement in the bifurcated ends 143 and 144 of the sleeve 142. These bifurcated ends 143 and 144 also taper inwardly to correspond with the countour of the cap 145. The two jaws 119 and 120 are provided with flanges 146 and 147, which work in grooves in the ends 143 and 144. These grooves are located at the upper inner and lower inner edges of the lips 143 and 144, as plainly shown in Fig. 16.

The outer end of the sleeve 142 is provided with a shoulder 148, which rides in a groove 149 in the bracket or standard F. The front end of this groove 149 is provided with a shoulder 150.

In Fig. 14 the jaws and coiling-heads 121 and 122 are shown open to their full extent. Now when the two heads are moved together, as before described, the two shafts 14 and 15 will be moved together toward the center of the machine. When this takes place, the sleeve 142 will also be carried forward on the shaft 15 by virtue of the friction between the same. It will be remembered that the sleeve carries the cap 145 and that the jaws work between the bifurcated ends 143 and 144 of the sleeve. Inasmuch as the positive power is only on the shaft 15 this shaft will have a tendency to work ahead of the sleeve and cap, so that the parts will assume the position shown in Fig. 15. When the parts assume this position, the jaws 118 and 119, carrying the coiling-heads 121 and 122, by virtue of the tapering shape of the cap 145 and bifurcated ends 143 and 144 of the sleeve 142 will have a tendency to move the jaws nearer together, as shown in said Fig. 15. These jaws are further guided by means of the flanges 146 and 147. (Shown in Fig. 16.) Now if the shaft 15 is moved farther to the right than is shown in Fig. 15 the shaft will also carry the sleeve 142 until the shoulder 148 thereon abuts against the shoulder 150 on the bracket F. When this is accomplished, the sleeve 142 can move no farther, nor can the cap 145, carried thereby, so that if the shaft 15 is further moved the cap will force the jaws and coiling-heads 121 and 122 tightly together, as shown in Figs. 22 and 32. These coiling-heads are each provided with a central longitudinal groove 151 and 152, respectively, which when combined will have a trifle greater diameter than the wire, so that the heads can revolve freely around the same.

To center the wire between the jaws when they approach each other, as described, the lower jaw 120 is provided with the two projections 153, which taper outwardly, as shown in Fig. 16. The upper jaw 119 is provided with a cut-out portion 154, which fits over these projections.

The mechanism and the wire have now assumed the position shown in Fig. 22—that is to say, the loop has been formed and the coiling-heads have been moved forward ready to perform the coiling, and the divided coiling-head has been closed in its coiling position. As the coiling-heads are revolving constantly in opposite directions, as already described, as soon as they come to the center they will by virtue of the shoulder 115 on the head 113 and the shoulder 123 on the lower portion of the head 122 grasp the oppositely-extending ends of the wire. (Shown in Fig. 22.)

The purpose of this machine is to form a knot with two coils on the wire and another coil on top of the two coils, forming a knot, as shown in Fig. 23. As shown in Fig. 22, no knot has been formed. In Fig. 23 two coils have been formed. To accomplish this, the heads are moved slightly apart to allow the second coil to be formed on the wire when the heads are moved together, so that the last coil can be formed around the two coils. The mechanism for separating and then bringing the heads together is controlled entirely by the offset portions of the groove 139 in the wheel 138. As shown in Fig. 2'', the groove 141 is provided with a projection or pin 155, which will throw the stud 140 on the lever 136, Fig. 7, slightly to the right, into the short offset portion 156 in the cam-groove 141. This movement is just enough to throw the heads slightly apart, as shown in Fig. 23, when the second coil is placed on the wire. After the second coil is made the stud 140 leaves the short offset portion 156 and goes back into the portion 141, bringing the heads together again, and the third coil is placed over the two coils in the wire, making a knot, as is shown in Fig. 23. After the third coil has been formed the stud 140 on the lever 136 passes into the groove 139, out of the offset portion of this groove, and the heads will be moved instantly back and the jaws 118 and 119 will be opened, allowing room for the knot to be pulled through. At the same time the heads are withdrawn the vises are also withdrawn and also the mandrel. Inasmuch as the vise 75 has been given a three-quarter turn to make the loop and then a quarter-turn back, it is necessary to give this vise a half-turn to get the vise back to its original position. This takes place at the time the vises and heads are being withdrawn and is accomplished by the arrangement of the offset portions 111 and 157 in the groove 109 in the wheel 108, as shown in Fig. 2'. When the vise 75 is in its normal position, the stud of the lever 107 is in the groove 109, and when the stud reaches the offset portion 157 it will make the vise rotate in the three-quarter turn, as described. The stud then will leave the offset portion 157 and go into the offset portion 111, turning the vise in the opposite direction a quarter-turn and will remain in that position until the knot is formed, when the stud will again enter the portion 109 and turn the vise back to its original position.

The knot having been formed the next operation is to draw the same out of the machine, so that the wire can be cut and another knot formed.

158 designates a frame extending out from the feed end of the table.

159 designates a bracket or standard in which is journaled the reel of wire to be knotted. The reel can be of the ordinary construction and is placed in a holder 160. On the hub of the holder is a band-brake 161.

162 designates a depending lever pivoted to the table. On the lower end of this lever is journaled an idler 163. Interposed between this lever and the leg B of the table is a coiled spring 163'. The band-brake 161 is connected to the lower end of the lever 162 by means of a strap 164, which has a flexible portion 165.

Slidingly secured on the frame 158 is a bearing 166. Journaled in this sliding bearing is a wheel 167. As plainly shown in Fig. 37, it will be seen that the journal 166 extends forwardly and has secured thereto a shaft 168. This shaft extends the whole length of the machine and passes under the table, as plainly shown in Fig. 1. Extending out from the other end of the table is a frame 169. Slidingly secured on this frame is a journal 170. On this journal is a wheel 171. By referring to Fig. 36 it will be seen that the journal extends inwardly toward the table and has its end secured to the end of the shaft 168.

171' designates adjustable stops to limit the inward movement of the journals 170.

U designates a support in which is secured a pressure-cylinder V. The shaft 168 passes through this cylinder, and the portion of the shaft within the cylinder is provided with a piston-head 172. (Shown in dotted lines, Fig. 1.)

173 designates a cam-wheel on the end of the shaft 12. This cam-wheel is provided with a cam-groove 174 on its periphery. This cam-groove is provided with an offset portion 175.

$a$ $a$ in Fig. 3 designate a pair of brackets extending up from the table A. On these brackets is journaled a shaft 176. Secured to the end of this shaft is a downwardly-extending arm 177, which is provided with a stud 178, which rides in the groove 174 in the wheel 173. Also pivoted to the end of the arm 177 is a link 179, more plainly shown in Fig. 2. The end of this link is pivoted to the upper end of a rock-shaft 180. The lower end of this shaft is pivoted to one of the legs B of the table, as shown in Fig. 3. Pivotally secured to about the center of this shaft is a stem 181, which is connected to a valve (not shown) in the chest 182 of the cylinder V. This valve controls the air or other motive power which passes into the cylinder.

183 designates an inlet-pipe which carries the motive power to the cylinder, and 184 designates a vent at the opposite end of the cylinder.

Immediately after the knot has been formed and the coiling-heads, vises, and the other parts of the machine have resumed their initial positions the valve in the chest 182 is opened by means of its connection with the cam-groove in the wheel 173. When this valve is opened, it will admit a motive power, preferably compressed air, behind the piston-head 172 in the cylinder V. Inasmuch as the head is rigid on the shaft 158, by the admittance of compressed air the shaft will be moved rapidly to the left, carrying the wheels 167 and 171 also to the left and drawing the knot rapidly away from the knotting mechanism. To make it possible to form a large number of knots rapidly, it is necessary that after the knot has been formed it should be drawn rapidly away the exact distance and leave enough wire in the rear of the knot to form one-half of the next knot. By referring to Fig. 1 it will be seen that when the wheel 167 is drawn to the left when the draw is made there is at that time a considerable length of wire between the reel and the machine. The wire which has already been drawn from the reel, by referring to Fig. 1, extends from the reel around the idler 163 and then back up over the wheel 167. The length of this amount of wire is sufficient to make the proper draw and leave enough wire beyond the knotting and cutting mechanisms to make half of the next knot. This feature of my invention I regard as important, for the reason that the drawing operation must be very rapid and positive, and I find by experience that it is impossible to make the draw directly from the reel, and by having the wire already withdrawn it can always be drawn into the machine rapidly and the exact amount required to make one-half of the knot be positioned beyond the cutting mechanism. After the wire has been drawn through, as described, the motive power to the cylinder is cut off by means of the valve in the chest 182, which is actuated by the cam-groove in the wheel 173 and the connections, as before described. When the power is cut off from the cylinder, the winding mechanism, to be described, will wind the wire up on the receiving-wheel, and the shaft 158, carrying the two wheels 167 and 171, will be moved to the right back to their original position, as shown in Fig. 1. When the wheel 167 is moved to the right, it will simply idle over the wire, for the wire which has been fed into the machine cannot work backward on account of the two ratchet-wheels 36 and 37, which have already been described and are plainly shown in Fig. 12. When the wheel 167 is moved to the right, it will uncoil the wire from the reel. At this time the pressure on the wheel 163 is to the right, and this tension will move the lever slightly to the right against the tension of the spring 163', thereby releasing the pressure of the band-brake 161 on the hub 160 of the reel-holder. The only object of the band-brake on the hub of the reel-holder is to keep the wire taut thereon and also keep the wire between the reel and the wheel 167 taut and in its proper position. After the wheel 167 has resumed its normal position and the wire has been cut the end of the wire at the feeding end of the machine is drawn in, as described; but as this operation is not as rapid or as much wire required it is not necessary to make any special provision to have the wire off of the reel, the feed-wheels 24 and 26 simply pulling off sufficient wire from the reel, and the wheels 163 and 167 will simply idle when this takes place.

To prevent too much draw of the wire after the knot has been formed, I provide an automatic stop, which is located the exact distance from the knotting mechanism, so that the knot can be drawn no farther. This stop, as more plainly shown in Figs. 1, 35, and 35', is in the form of a bell-crank and is designated as 186. This stop has its corner pivoted on a bracket 187, which in turn is supported on the end of the table. Extending out from this bracket is a horizontal arm 188, which is provided with guides 189, which work between the sides of the stop and serve to center the same. The outer end of the horizontal end of the stop is provided with the depending bifurcated portion 190, which when the stop is down will rest over the wire and prevent the knot from passing through. The vertical portion of the stop is provided with a shoulder 191, and the upper end is bifurcated, as shown at 192.

By referring to Fig. 3 it will be seen that rigidly supported on the shaft 176 are two standards 193 and that the upper ends of these standards are connected by a cross-piece 194. This cross-piece 194 is journaled in the ends of the standards and has rigidly secured thereto, by means of the set-screw 195, a trip 196. The front end of this trip is provided with a hook 197, and this front end is normally adapted to rest in the bifurcation 192 in the end of the vertical portion of the stop, with the hook resting directly over the shoulder 191.

198 designates a coiled spring having its opposite ends secured to the table and the horizontal portion of the stop to normally hold the stop down.

As before described, the shaft 176, through the arm 177, will be rotated when the cam-wheel 173, carrying cam-groove 174, is rotated. When the stud on the arm 177 passes into the offset portion 174 of the cam 173 the shaft 176 will be rotated to the right, thereby moving the trip to the right. At this time the knot has been formed, the knotting mechanism withdrawn, and, as described, the valve in the chest 182 of the cylinder opened. As the trip is moved to the right the hook 197 will engage the bifurcated end 192 of the vertical portion of the stop. This will raise the horizontal portion of the stop sufficient to allow the knot to pass under. After the knot has passed under the stop the shoulder 191 will commence to bear against the end of the trip, lifting the same, so that the hook will become disengaged from the vertical portion of the stop and the spring 198 will instantly pull down the stop before the knot which has just been formed reaches the same. This stop bearing against the knot will rigidly hold the wire, so that no more can pass through the machine when the winding takes place. When the stud on the arm 177 leaves the offset portion 174 in the cam-groove 173, the trip will resume its normal position (shown in Fig. 1) ready for the next operation.

To be certain that the knot is always carried far enough by the air-pressure in the cylinder, I provide the following auxiliary mechanism, which is used more in the nature of a safeguard to always assure the proper and the equal distance between the knots:

199 and 200 designate two standards extending up from the frame 169. Secured to these standards are guideways 201. Slidingly secured to this guideway is a head 202. This head and the mechanism connected therewith are plainly shown in Fig. 38. This head has extending out from one side two flanges 203 and 203', on the outer ends of which and between the same is journaled a movable lip 204. This lip extends forwardly and is normally arranged to have its free end pressed inwardly toward the wire. This is accomplished by means of the spring 205. Rigidly secured to the head and opposite to the movable lip 204 is a stationary lip 206. On the end of the shaft 7 is a bevel gear-wheel 207, which meshes with a bevel gear-wheel 208 on the shaft 210, which is journaled on the upper end of a standard 209, which is supported by the table U. On the end of this shaft 210 is secured a crank-arm 211. Extending out from the head 202 is a pin 212. The pin 212 and the end of the crank 211 are connected by means of a link 213. Inasmuch as the shaft 7 is revolving all the time, it will also make the shaft 210 rotate continuously, and by means of the crank 211 and pitman 213 the head 202 will be constantly reciprocating. When the knot is drawn from the machine, it will pass between the lips 204 and 206, the yielding lip opening to allow the knot to pass through, when it will close again upon the wire, as shown in Fig. 2. Now if for any reason the air-cylinder fails to draw the knot the exact distance the head coming up behind the knot will force it along, so the required distance between the knots is always obtained. The length of the pitman 213 is the exact length to move the knot the required distance if the air-cylinder fails to draw the proper distance.

When it is required to vary the distance between the knots, it is only necessary to move the standard carrying the stop 186 to either the right or the left, according to whether it is desired to shorten or lengthen the distance between the knots. After the standard has been moved the pitman 213 is either lengthened or shortened accordingly. The stops 171 are also moved to change the length of the stroke of the piston on the shaft 168. The cylinder V is made long enough to accommodate any ordinary lengths between the knots now in commercial use.

After the wire with the knots leaves the wheel 171 it is brought back and wound upon the winding-reel 214. As shown in Fig. 5, it will be seen that this reel is journaled on a shaft 214', which is supported on the posts 216 and 217. On the inner end of this shaft 214' is secured a clutch 219. Journaled on the post 220 is a pulley-wheel 221, which is adapted to be clutched to the shaft 214' by means of the clutch 219. Also on the shaft 214' is a ratchet-wheel 222, which only allows the shaft to be rotated in one direction—that is, the direction to wind the wire up on the reel. This ratchet-wheel can be of any well-known construction, and it is not thought necessary to here describe it in detail. The wire before reaching the reel passes under a gravity tightening-wheel 223 and over an ordinary coiling-wheel 224. The gravity-wheel 223 is mounted on the posts 225 and will always keep the proper tension on the wire. The clutch 219 is actuated by the rod 226, which is moved in or out by means of the hand-lever 227, as shown in Fig. 5. The clutch 219 is set against the wheel 221 with only sufficient pressure to turn the shaft 214', carrying the winding-reel 214, when there is no tension on the wire or just when the wheel 171 is being moved to the right. At other times the clutch has not enough pressure to turn the shaft 214', and the clutch will simply ride over the face of the wheel. The movement of the wheel 171 inwardly will be arrested by the stops 171'.

In the commercial use of this check-row wire it is generally made in coils of eighty rods, and I therefore provide means for automatically stopping the machine when this amount of wire has been made. I do not desire to limit myself to eighty rods, as it is obvious that I might vary the length of the coil with but slight alterations and at the same time be within the spirit of my invention.

As shown in Fig. 5, the clutch 3 is actuated by a lever 228. The lower end of this lever is pivoted to a handle 229 by a pin 228'. The handle 229 is pivoted to the shaft 52, as shown in Fig. 14. It will be seen that when this handle is moved upwardly the clutch 3 will engage with the wheel 4 and that when the handle is lowered the clutch will be released. In Fig. 5 the clutch is shown clutched to the actuating-wheel or belt-pulley 4. On the shaft 12 is a worm 230. This worm and the other mechanism to be now described are more plainly shown in Figs. 4, 39, and 40. Below the worm 230 is a post 231. Adjacent to the upper end of this post is rigidly secured a stud 232, as shown in Fig. 41. The outer end of this post is screw-threaded and provided with a nut 233. Loosely mounted on the stud 232 is a small pinion 234. The hub of this pinion extends outwardly, as shown at 235, Fig. 41. Loosely mounted on this outwardly-extending portion of the hub is a gear-wheel 236, which meshes with the worm 230. Also loosely mounted on the stud 232 is an indicator 237, which is secured to the hub of the pinion 234 by means of the pins 238. Meshing with the pinion 234 is a gear-wheel 239, which is also journaled on the post 231. This wheel is provided with a flange 240 on its sides. This flange does not extend entirely around, leaving an opening 241, as plainly shown in Figs. 39 and 40. Extending outwardly from the post 231 is an arm 242. On the outer end of this arm is pivoted a lever 243. The opposite end of the lever is slidingly secured in a slot 245, which is in the depending link 244, which hangs from the pivot-pin 228', as plainly shown in Fig. 40.

The manner in which the machine is automatically stopped when a given number of rods have been made is as follows: Say, for instance, that the machine will stop when eighty rods have been completed and that the knots are three feet four inches apart, which is the smallest distance now in general use. In eighty rods, the knots being at the distance mentioned apart, there will be exactly three hundred and ninety-six knots. It will be remembered that the shaft 12, carrying the worm 230, makes one revolution when each knot is formed. By referring to Fig. 39 it will be seen that the gear 236 is moved one tooth with each revolution of the worm. Now assuming that the gear 236 makes four revolutions to the gear 239 and that there are ninety-nine teeth on the gear 236, when the gear 236 rotates four times the shaft 12, carrying the worm, must have rotated three hundred and ninety-six times, making that number of knots. When that many knots have been made, the wheel 239 has only rotated once. Now to automatically release the clutch 3 from the pulley 4 it is only necessary to allow the lever 243 to drop, which will pull down the inner end of the lever 229, thereby releasing the clutch, as before described. By referring to Figs. 39 and 40 it will be seen that the lever 243 is supported in its upper position by means of a pin 246, which rests on the flange 240 on the wheel 239. The gear 239 can be set in any position in relation to the gear 236 by unscrewing the nut 233, Fig. 41. When the nut is unscrewed, the indicator is turned, which will move the pinion 234, which meshes with the gear 239. When the gear 239 is properly set, the nut is screwed up tight, making the indicator 238, the gear 236, and the pinion 234 revolve as one.

In making the knots three feet four inches apart, which is the smallest distance now in use, the gear 239 is in the position shown in Fig. 40 at the initial position of the machine. It will be seen that if the knots are placed farther apart there will not be so many in a given number of rods, so that the gear 239 is moved in the direction of the arrow by the mechanism just described, allowing the lever 243 to drop sooner. When the gear 239 has made one revolution from the position shown in Fig. 40, the pin 246 will pass out through the opening 241 in the flange 240, allowing the lever to drop, thereby releasing the clutch 3 from the pulley 4. To make the lever drop suddenly, I provide a weight 247, placed near the end thereof.

For the purpose of convenience the indicator 238 is provided with a series of indicating-points 248 to more readily ascertain the position of the gear 239 relative to the gear 236 and the stud 246 on the arm 243.

I am aware that many minor changes can be made in the construction and arrangement of parts of this machine without in the least departing from the nature and principles of my invention.

Having thus described my invention, what I claim as new, and desire to secure by Letters Patent, is—

1. In a check-row-wire machine, the combination with the knotting and cutting mechanisms, of a revolving feed-wheel adapted to feed the cut end of the wire forward to the knotting mechanism, the feed-wheel normally out of contact with the wire, and means for bringing the feed-wheel into contact with the wire only at the time the feeding is done.

2. In a check-row-wire machine, the combination with the knotting and cutting mechanisms, of a pair of feed-wheels and means for constantly revolving the same, the feed-wheels adapted to feed the cut end of the wire forward to the knotting mechanism, means for keeping the feed-wheels normally out of contact with the wire, and means for bringing the feed-wheels into contact with the wires only at the time the feeding is done.

3. In a check-row-wire machine, the combination with the knotting and cutting mechanisms, of a pair of feed-wheels adapted to feed the cut end of the wire to the knotting mechanism, means for gearing the two wheels together, means for normally holding the wheels out of contact with each other, and means for automatically bringing the wheels into contact with the wire only at the time that the feeding is done.

4. In a check-row-wire machine, the combination with the knotting and cutting mechanisms, of a pair of feed-wheels adapted to feed the cut wire to the knotting mechanism, the feed-wheels being normally spaced apart but geared together and out of contact with the wire, and means for bringing the wheels together and in contact with the wire only at the time that the feeding is done.

5. In a check-row-wire machine, the combination with the knotting and cutting mechanisms, of a pair of feed-wheels adapted to feed the cut wire to the knotting mechanism, the feed-wheels being normally spaced apart but geared together and out of contact with the wire, a protrusion on one feed-wheel, and means for bringing the wheels together and the protrusion on the feed-wheel into contact with the wire only at the time that the feeding is done.

6. In a check-row-wire machine, the combination with the knotting and cutting mechanisms, of a pair of feed-wheels adapted to feed the cut wire to the knotting mechanism, the feed-wheels being normally spaced apart but geared together, one feed-wheel deriving motion from the other, the driven feed-wheel idling on a shaft which has an eccentric portion in relation to its line of axis, and means for partly rotating the shaft bringing the driven wheel closer to the other wheel so that they both will come into contact with the wire only at the time that the feeding is done.

7. In a check-row-wire machine, the combination with the knotting and cutting mechanisms, of constantly-revolving feed-wheels for feeding the cut wire to the knotting mechanism, the feed-wheels only being in contact with the wire at the time of the feeding, and means for holding the wire in its fed position and during the time that the knotting is taking place.

8. In a check-row-wire machine, the combination with the knotting and cutting mechanisms, of constantly-revolving feed-wheels for feeding the cut wire to the knotting mechanism, the feed-wheels only being in contact with the wire at the time of the feeding, and a pair of idling wheels bearing at all times tightly against the wire, and means for preventing the idling wheels from rotating but in one direction thereby preventing backward movement of the wire.

9. In a check-row-wire machine, the combination with the looping, cutting and feed mechanisms for the cut wire, of means carried by the cutting mechanism, for guiding the end of the wire which is fed, into position for the looping mechanism and positioning the end of the wire which is not fed in position for the looping mechanism.

10. In a check-row-wire machine, the combination with the looping, cutting and feed mechanisms for the cut wire, of a movable mandrel around which the ends of the wire are looped, mechanism for first moving the mandrel into position and then cutting and feeding one end of the wire forward into position for looping, mechanism for constantly keeping the mandrel moving, and a guide carried by the cutting mechanism for guiding the end of the wire which is fed, up over the mandrel and moving the same wire to one side of the center and also positioning the end of the wire which is not fed in position for the looping mechanism.

11. In a check-row-wire machine, the combination with the looping, cutting and feed mechanisms for the cut wire, of a movable mandrel around which the ends of the wire are looped, mechanism for first moving the mandrel into position, a finger for holding the wire down so that the mandrel will pass over the same, mechanism for then cutting and feeding one end of the wire forward, a guide carried by the cutting mechanism for guiding the end of the wire which is fed, up over the mandrel and moving the same wire to one side of the center and also positioning the end of the wire which is not fed in position for the looping mechanism, and a movable support for the wire, which is not fed, for holding the same and guiding it to one side of the center, and mechanism for withdrawing the support and guide when the looping takes place.

12. In a check-row-wire machine, the combination with the cutting and feeding mechanisms for the cut wire, of a pair of vises, a movable mandrel in one vise, means for moving the mandrel in position over the wire, then cutting the wire and feeding one end up over the mandrel and then bringing the vises together, and mechanism for revolving one vise to form the loop.

13. In a check-row-wire machine, the combination with a movable mandrel, of means for cutting the wire and positioning the ends above and below the mandrel, a pair of vises, one vise surrounding the mandrel but moving independently of the same, means for bringing the vises together, one vise provided with bending portions to engage the ends of the wire and rams, the other vise being provided with grooves into which the rams on the first-mentioned vise force the wires, and means for rotating the vise provided with the bending portions and rams.

14. In a check-row-wire machine, the combination with a movable mandrel, of means for moving the mandrel into position, cutting the wire and positioning the ends above and below the mandrel, a pair of vises one vise surrounding the mandrel but moving independently of the same, means for bringing the vises together after the ends of the wire have been positioned above and below the mandrel, mechanism for revolving one vise a three-quarter turn to form the loop and then a quarter-turn back, a pair of coiling-heads normally apart, the head at the drawing end of the machine being formed in two parts, and mechanism for drawing the heads together after the loop has been formed and automatically closing the two-part head.

15. In a check-row-wire machine, the combination with a pair of shafts rotating in opposite directions, and mechanism for moving the shafts toward each other, of an integral coiling-head secured to one shaft, a pair of links secured to the other shaft, the opposite ends of the links being pivoted to one part each of a divided coiling-head, and a sleeve surrounding and in frictional contact with the shaft provided with a tapering cap surrounding the coiling-heads, and means for limiting the inward movement of the sleeve.

16. In a check-row-wire machine, the combination with a pair of shafts rotating in opposite directions, and mechanism for moving the shafts toward each other, of an integral coiling-head secured to one shaft, a divided coiling-head secured to the other shaft, means for closing the divided coiling-head when the two heads are moved together, and a lip on one part of the divided head adapted to overlap the other part when the two parts are together, the lip extending over the joint between the same.

17. In a check-row-wire machine, the combination with a pair of shafts rotating in opposite directions, and mechanism for moving the shafts toward each other, of an integral coiling-head secured to one shaft, a pair of links secured to the other shaft, the opposite ends of the links being pivoted to one part each of a divided coiling-head, a sleeve surrounding the shaft and in frictional contact therewith, the sleeve being provided with a tapering bifurcated head in which the coiling-heads work, a tapering cap surrounding the bifurcated tapering end of the sleeve, and means for limiting the inward movement of the sleeve.

18. In a check-row-wire machine, the combination with a pair of shafts rotating in opposite directions and the vises for looping the wire, of coiling-heads secured to the ends of the shafts, mechanism for moving the heads tight up against the vises and holding the heads there until one coil is wound around the wire, then slightly withdrawing the heads from the vises until the second coil is made and then bringing the heads close up again to the vises until the loops are completed and then withdrawing the shafts carrying the heads.

19. In a check-row-wire machine, the combination with a longitudinally-movable shaft arranged under the machine and having its opposite ends extending beyond the same, of a frame at each end of the machine, wheels slidingly journaled on each frame, the opposite ends of the shaft being secured to the journals of the wheels, the wire to be knotted passing around the wheel at the feed end of the machine and the knotted wire passing around the wheel at the drawing end of the machine, a cylinder beyond the drawing end of the machine through which the shaft passes, a piston-head on the shaft within the cylinder, and means for admitting motive power to the cylinder in the rear of the piston-head as soon as the knot has been formed moving the shaft and the wheel at the drawing end of the machine away therefrom and moving the wheel at the feed end of the machine nearer thereto, means for cutting off the supply of motive power to the cylinder when the wire has been drawn the required distance, and winding mechanism for winding the knotted wire and pulling the wire off of the wheel at the drawing end of the machine and returning the shaft to its initial position.

20. The combination with a check-row-wire machine, of an independent motive power for drawing the wire after the knots have been formed, and an auxiliary drawing mechanism actuated by the machine adapted to draw the wire the required distance if the independent drawing mechanism fails to draw the knot the required distance.

21. The combination with a check-row-wire machine, of an independent motive power for drawing the wire after the knots have been formed, the motive power being controlled by the machine, an auxiliary drawing mechanism, a head carried by the auxiliary mechanism, the head surrounding the wire, and means for reciprocating the head so that it will slide up the wire in the rear of the knot and engage the same if the independent motive power fails to draw the knot the required distance.

22. The combination with a check-row-wire machine, of an independent motive power for drawing the wire after the knots have been formed, means carried by the machine for controlling the same, a stop for controlling the length of the draw, a trip for raising the stop at the initial movement of the draw, and means carried by the stop for disengaging the trip and allowing the stop to regain its position over the wire before the draw is finished.

23. The combination with a check-row-wire machine, means for connecting the machine with the source of power, and mechanism actuated by the machine for disconnecting the machine from the source of power when a predetermined number of knots have been formed.

24. In a check-row-wire machine, the combination with the primary actuating-shaft, belt-pulley and clutch for clutching the shaft to the pulley, and the hand-lever for the clutch, a secondary lever connected to the clutch, and mechanism actuated by the machine for actuating the secondary lever and unclutching the clutch when a predetermined number of knots have been formed.

25. In a check-row-wire machine, the combination with the means for connecting the machine with the source of power, a lever connected to the said means, a gear-wheel 239, a circular flange on the side of the wheel, the ends of the flange not meeting leaving an opening, a stud on the lever resting on the flange, and gearing connecting the machine to the wheel 239 for actuating the same.

26. In a check-row-wire machine, the combination with the means for connecting the machine with the source of power, a lever connected to the said means, a gear-wheel 239, a circular flange on the side of the wheel, the ends of the flange not meeting leaving an opening, a stud on the lever resting on the flange, gearing connecting the machine to the wheel 239, and means for setting the wheel in a predetermined position independently of the gearing.

In testimony whereof I have hereunto set my hand in the presence of two witnesses.

GEORGE W. CROZIER.

Witnesses:
W. DU VAL BROWN,
WM. A. THORNBURG.